United States Patent [19]
Parri et al.

[11] Patent Number: 6,013,197
[45] Date of Patent: *Jan. 11, 2000

[54] LIQUID CRYSTALLINE COPOLYMER

[75] Inventors: Owain Llyr Parri; Ian Bonny, both of Poole; Ian Victor E. Hassall, Christchurch; Mark John Goulding; Simon Greenfield, both of Poole; Emma Jane Brown, Weymouth; David Coates, Wimborne, all of United Kingdom

[73] Assignee: Merck Patent Gesellschaft mit Beschrankter Haftung, Darmstadt, Germany

[*] Notice: This patent is subject to a terminal disclaimer.

[21] Appl. No.: 08/986,873

[22] Filed: Dec. 8, 1997

Related U.S. Application Data

[62] Division of application No. 08/604,896, Feb. 22, 1996, Pat. No. 5,720,900, which is a division of application No. 08/269,501, Jul. 1, 1994, Pat. No. 5,518,652.

[30] Foreign Application Priority Data

Jul. 5, 1993 [EP] European Pat. Off. .............. 93110680

[51] Int. Cl.[7] .......................... C09K 19/52; C09K 19/12; C09K 19/30; C08F 18/20
[52] U.S. Cl. .................. 252/299.01; 252/299.62; 252/299.63; 252/299.66; 252/299.67; 526/245
[58] Field of Search ................. 252/299.63, 299.66, 252/299.62, 299.01; 526/245

[56] References Cited

U.S. PATENT DOCUMENTS

| | | | |
|---|---|---|---|
| 4,661,576 | 4/1987 | Decobert et al. | 572/298 |
| 4,925,589 | 5/1990 | Lorenz | 252/299.01 |
| 5,164,111 | 11/1992 | Dorsch et al. | 252/299.01 |
| 5,271,866 | 12/1993 | Uchida et al. | 252/299.01 |
| 5,288,425 | 2/1994 | Scherowsky et al. | 252/299.01 |
| 5,288,475 | 2/1994 | Scherowsky et al. | 252/299.01 |
| 5,332,520 | 7/1994 | Bach et al. | 252/299.01 |
| 5,332,570 | 7/1994 | Bach et al. | 252/299.01 |
| 5,352,380 | 10/1994 | Scherowsky et al. | 252/299.01 |
| 5,384,069 | 1/1995 | Yoshinaga et al. | 252/299.01 |
| 5,401,437 | 3/1995 | Im et al. | 252/299.01 |
| 5,426,009 | 6/1995 | Coates et al. | 430/20 |
| 5,700,393 | 12/1997 | Akelly | 252/299.63 |
| 5,709,911 | 1/1998 | Onishi et al. | 428/1 |
| 5,820,779 | 10/1998 | Shouji et al. | 252/299.01 |

FOREIGN PATENT DOCUMENTS

| | | |
|---|---|---|
| 0 228 703 | 7/1987 | European Pat. Off. . |
| 0 412 485 | 2/1991 | European Pat. Off. . |
| 2 185 487 | 7/1987 | United Kingdom . |
| 2240548 | 7/1991 | United Kingdom . |
| 2257432 | 1/1993 | United Kingdom . |
| 91/19973 | 12/1991 | WIPO . |

*Primary Examiner*—C. H. Kelly
*Attorney, Agent, or Firm*—Millen, White, Zelano & Braingan, P.C.

[57] ABSTRACT

The invention relates to copolymers made from monoreactive liquid and/or di-reactive liquid crystals which can be photopolymerized to form copolymers and to novel reactive liquid crystal compound having a nematic phase. Preferentially the reactive liquid crystal is polymerized while in the liquid crystal phase to produce an oriented birefringent polymer film. To do this, the reactive liquid crystal, in its nematic or smectic phase is aligned (by well known techniques such as rubbed polyimide, etc.) and the thin film containing a small amount of photoinitiator, is subjected to ultraviolet light whereupon it polymerizes into a thin, aligned polymer film.

17 Claims, No Drawings

LIQUID CRYSTALLINE COPOLYMER

This application is a divisional application of U.S. application Ser. No. 08/604,896, filed Feb. 22, 1996, U.S. Pat. No. 5,720,900 which is a divisional application of U.S. application Ser. No. 08/269,501, filed Jul. 1, 1994, now U.S. Pat. No. 5,518,652, issued May 21, 1996, which are hereby incorporated by reference.

The invention relates to copolymers made from mono reactive liquid and/or di reactive liquid crystals which can be photopolymerized to form copolymers and to novel reactive liquid crystal compounds having a nematic phase. Preferentially the reactive liquid crystal is polymerized while in the liquid crystal phase to produce an oriented birefringent polymer film. To do this the reactive liquid crystal, in its nematic or smectic phase is aligned (by well known techniques such as rubbed polyimide etc.) and the thin film containing a small amount of photoinitiator, is subjected to ultra-violet light whereupon it polymerizes into a thin, aligned polymer film.

Alternatively the mixture of reactive liquid crystal can be polymerized in a solution of,for example,dichloromethane. or toluene or tetrahydrofuran, using AIBN as initiator and heated for 24 hours at 30–60° C. This produces a non aligned polymer which is less easily manipulated than the polymer film but may have other applications.

Most reactive liquid crystals presently known exhibit a high melting point and a very short temperature range phase, also many are only smectic. This severely limits the use of these materials. The authors have found new materials which exhibit a relatively low melting point and wide liquid crystal phase range particularly nematic. Advantageously, these can be mixed together to produce low melting, wide range nematic reactive liquid crystal mixtures. By changing the types of core group the optical properties of the film can be changed e.g. high birefringence core groups lead to films with a high birefringence. By changing the ratio of mono:di reactive groups the Tg of the system can be altered.

The incorporation of chiral groups into the reactive liquid crystal produces cholesteric phases. Typically this is done by the incorporation of a chiral alkyl chain but a chiral group between ring systems can also be used. By changing the amount of chiral reactive liquid crystal the pitch length of the cholesteric phase can be altered. Generally, when polymerized there is very little change in pitch length. It is also possible to add nonreactive materials containing a chiral group to induce a cholesteric phase.

It was therefore necessary to develop a completely new material concept in order to fulfill the requirements outlined above resp. to fulfill them to a greater extent than is the case with conventional liquid crystal polymers. Other objects of the present invention are evident for the expert from the following detailed description of the invention.

It was found that these objects could be achieved by the copolymers according to the present invention.

The invention thus relates to a liquid crystalline copolymer obtainable by copolymerization of at least one polymerizable reactive component A of formula $$R^1\text{—}P\text{—}X\text{—}A^1\text{—}Z^1\text{—}A^2\text{—}R^2 \quad (I)$$

wherein
R1 is $CH_2$=CW—COO—,

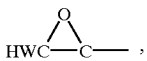

HWN—, $CH_2$=CH— or HS—$CH_2$—$(CH_2)_m$—COO— with W being H, Cl or alkyl with 1–5 C atoms and m being 1–7.

P is alkylene with up to 12 C atoms, it being also possible for one or more nonadjacent $CH_2$ groups to be replaced by —O—

X is —O—, —S—, —COO—, —OCO—, —C≡C— or a single bond, $R^2$ is a straight-chained, branched or chiral alkyl radical with up to 15 C atoms which is unsubstituted, mono- or polysubstituted by halogen, it being also possible for one or more $CH_2$ groups in these radicals to be replaced, in each case independently of one another, by —O—, —S—, —CO—, —OCO—, —CO—O— or —O—CO—O— in such a manner that oxygen atoms are not linked directly to one another, or alternatively $R^2$ has one of the meanings given for $R^1$—P—X—, Al is a 1,4-cyclohexylene, a 1,4-phenylene in which one or two CH groups may be replaced by N or a naphthalene-2,6-diyl radical which is unsubstituted or substituted by 1 to 4 halogen atoms, $A^2$ is

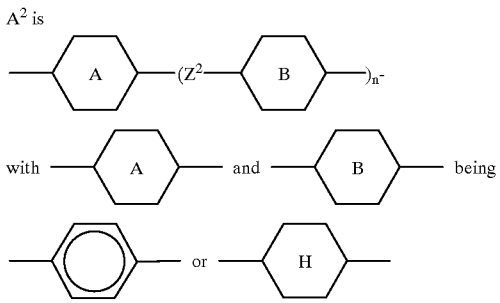

it being possible for these rings to be substituted by CN or halogen and one of the 1,4-phenylene groups can also be replaced by a 1,4-phenylene radical in which one or two CH groups are replaced by N.
and
$Z^1$ and $Z^2$ are each independently —CO—O—, —O—CO—, —$CH_2CH_2$—, —C—C— or a single bond,
n is 0 or 1,
and at least one polymerizable component B of formula II

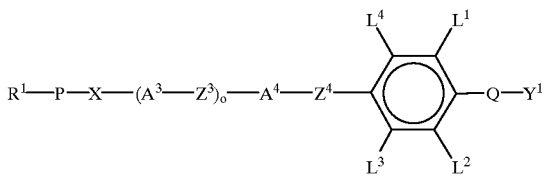

(II)

wherein $R^1$, P, X have the meaning given for formula I, and $Y^1$ is —H, —F or —Cl,
Q is —$CF_2$, —$OCF_2$, —$C_2F_4$, or —$OC_2F_4$, or a single bond, if $Y_1$ is F or Cl
A3 and A4 are each independently (c) 1,4-phenylene radical in which one or two CH groups can be replaced by N, (d) a 1,4 cyclohexylene radical in which one or two non-adjacent $CH_2$ groups can be replaced by —O— or —S—, or (e) a naphthalene-2,6-diyl radical, a piperidine-1,4-diyl radical, a thiophene-2,5-diyl radical, a 1,3,4 thiadiazol-2,5-diyl radical, it being possible for radicals (c) and (d) to be substituted by CN or halogen, Z3 is, independently of one another, —$CH_2CH_2$—, —COO—, —OCO—, —C≡C— or a single bond, Z4 is —$CH_2CH_2$—, —C—C- or a single bond, L1 through L4 are each independently H, halogen, —$CH_3$, —$CF_3$ or —CN, preferably H or fluorine.

o is 0, 1 or 2, and the groups A3 being same or different in the case that o is 2.

The polymeric composite materials according to the present invention are being based on a liquid crystal copolymer. The liquid crystal copolymer can consist of one liquid crystal copolymer resp. oligomer or a mixture of two or more liquid crystal copolymers and/or oligomers of different chemical composition. Mixing can be effected by solving the different liquid crystal copolymers and/or oligomers in a suitable solvent like, for example, dichloromethane (DCM), with subsequent evaporation of the solvent or by other methods.

The liquid crystal copolymers used are side chain copolymers and/or oligomers of formula A

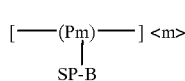

A wherein

Pm is a polymer main chain group

SP is a bivalent spacer group,

B is an organic rod-like radical containing at least two six-membered groups, including the radicals of formula I'—$A^1$—$Z^1$—$A^2$—$R^2$(I') and of formula II'

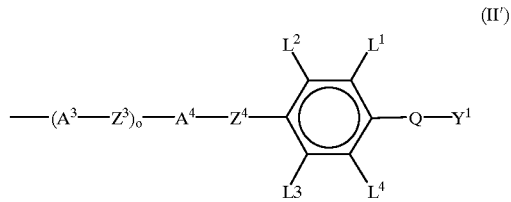

(II')

<m> is the mean degree of polymerization.

Formula A is merely intended to symbolize side-chain copolymers in a relatively diagrammatic manner; thus, it is not necessary, for example, for each main-chain unit to carry a mesogenic unit, and it is also possible, for example, to use copolymers in which Pm represents various main-chain units. Furthermore, Pm or, in the case of copolymers, one or more groups Pm may be one or more mesogenic groups, so that formula A also covers combined main-chain/side-chain oligomers and polymers.

A good review on side-chain polymers and processes for their preparation is given by H. Finkelmann in *Thermotropic Liquid Crystals*, ed. by G. W. Gray, Chichester 1987, p. 159 ff, which describe the preparation of side chain polymers by 'solution polymerization'.

If a mixture of 2 or more liquid-crystalline oligomers and/or polymers is used, <m> is the arithmetic mean of the mean degrees of polymerization of the various components of the phase.

Liquid-crystalline copolymers may be liquid-crystalline or not; in case they are liquid-crystalline they may have various phases, a correlation frequently being observed for side-chain polymers containing mesogenic groups B which are not too polar between the phase sequence of the corresponding low-molecular weight compounds B and that of the side-chain polymers (see *Thermotropic Liquid Crystals*. ed. by G. W. Gray, —Chichester 1987, p. 164). Liquid-crystalline polymers and in particular side-chain polymers having a nematic and/or smectic phase and further particularly having a nematic phase are preferred, the terms nematic and smectic being broadly drawn and also covering cholesteric-nematic and cholesteric-smectic phases having a helical structure.

Suitable polymeric backbones -(-Pm-)- are in principal all polymers whose chains have a certain flexibility. These may be linear, branched or cyclic polymer chains. The degree of polymerization is normally at least 10 and in particular at least 15; however, oligomers containing 3 to 15 monomer units are also possible.

The polymers obtainable by solution polymerization show as a rule a degree of polymerization of 10–100. The polymers obtainable by in situ photopolymerization, which are a preferred embodiment of this invention exhibit as a rule a degree of polymerization which is higher than 100, preferably higher than 400, in particular higher than 500.

Preference is given to polymers containing C—C main chains, in particular polyacrylates, polymethacrylates, poly-α-halo-acrylates, poly-α-cyanoacrylates, polyacrylamides, polyacrylonitriles or polymethylene malonates. Further preference is also given to polyesters, polyamides, polyimides, polyphophazenes, polyurethanes, and, in particular, to poly-siloxanes.

Suitable spacers are in particular linear or branched alkylene groups having 1–12 and, in particular, 1–8 carbon atoms, in which, in addition, one or more non-adjacent $CH_2$ groups may be replaced by —O—, —S—, —O—CO—, —CO—O—, —CH—, or —C≡C—.

Examples of suitable spacers are the following groups: ethylene, propylene, butylene, pentylene, hexylene, heptylene, octylene, nonylene, decylene, undecylene, dodecylene, octadecylene, ethyleneoxyethylene, methyleneoxybutylene, ethylene-thioethylene, ethylene-N-methyl-iminoethylene and 1-methyl- alkylene.

The rod-like mesogenic groups are generally low-molecular-weight liquid-crystalline radicals which are bonded terminally or laterally to the polymer chain via sufficiently flexible spacers. In the case of terminal linking, which is generally preferred, these radicals are able to rotate about the molecular long axis and therefore have cylindrical symmetry.

The formula I' covers the bicyclic and tricyclic radicals of the sub-formulae I'1–I'2:

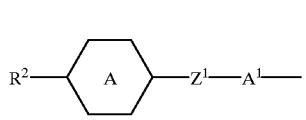

I'1

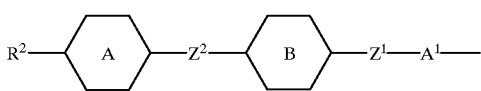

The formula II' covers bicyclic, tricyclic and tetracyclic radicals of the sub-formulae II'1–II'3.

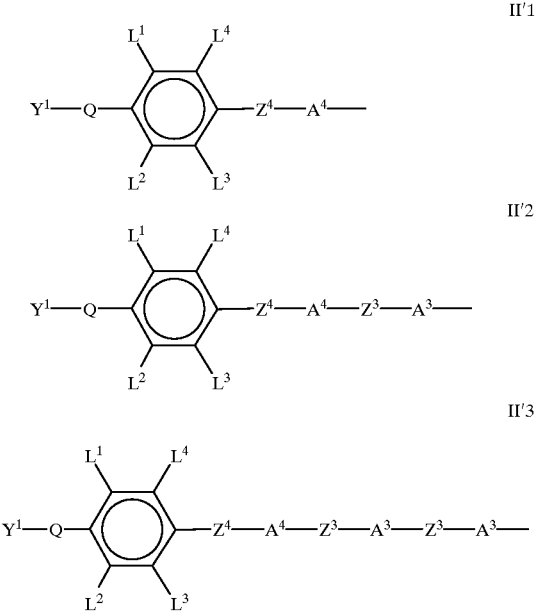

In the mesogenic radicals of the formula I', $R^2$ is preferably an alkyl or alkenyl radical which is unsubstituted or substituted by at least o ne halogen atom, it being possible for one or two non-adjacent $CH_2$ groups of these radicals to be replaced by O atoms and/or by —O—CO—, —CO—O— and/or —O—CO—O groups.

$Y^1$ is preferably F or Cl.

Furthermore, the mesogenic radicals of the formula II' in which Q-Y is F or Cl are preferred.

If $R^2$ is an alkyl radical or alkoxy radical, this may be straight-chain or branched. It is preferably straight-chain, has 2, 3, 4, 5, 6, 7 or 8 carbon atoms and accordingly is preferably ethyl, propyl, butyl, pentyl, hexyl, heptyl, octyl, ethoxy, propoxy, butoxy, pentoxy, hexoxy, heptoxy or octoxy, furthermore methyl, nonyl, decyl, undecyl, dodecyl, tridecyl, tetradecyl, pentadecyl, methoxy, nonoxy, decoxy, undecocy, dodecocy, tridecoxy or totradecoxy.

Oxaalkyl is preferably straight-chain 2-oxapropyl (=methoxymethyl), 2-(=ethoxymethyl) or 3-oxabutyl (=2-methoxyethyl), 2-, 3- or 4-oxapentyl, 2-, 3-, 4- or 5-oxahexyl, 2-, 3-, 4-, 5- or 6-oxaheptyl, 2-, 3-, 4-, 5-, 6- or 7-oxaoctyl, 2-, 3-, 4-, 5-, 6-, 7- or 8-oxanonyl, or 2-, 3-, 4-, 5-, 6-, 7-, 8- or 9-oxdecyl.

If $R^2$ is an alkenyl radical, this may be straight-chain or branched. It is preferably straight-chain and has 2 to 20 carbon atoms. Accordingly, it is particularly vinyl, prop-1 - or -2-enyl, but -1-, -2- or -3-enyl, pent-1-, -2-, -3- or -4-enyl, hex-1-, -2-, -3-, -4- or -5-enyl, hept-i-, -2-, -3-, -4-, -5- or -6-enyl, oct-1-, -2-, -3-, -4-, -5-, -6- or 7-enyl, non-I-, -2-, -3-, -4-, -5-, -6-, -7- or -8-enyl, or dec-1-, -2-, -3-, -4-, -5-, -6-, -7->-8- or -9-enyl.

Mesogenic radicals of the formula I' containing a branched wing group $R^1$ may occasionally be of importance as comonomers, for example due to a reduction in the tendency towards crystallization. Branched groups of this type generally contain not more than one chain branch. Preferred branched radicals $R^1$ are isopropyl, 2-butyl (=1-methylpropyl), isobutyl (=methylpropyl), 2-methylbutyl, isopentyl (=3-methylbutyl), 2-methyl-pentyl, 3-methylpentyl, 2-ethylhexyl, 2-propylpentyl, 2-octyl, isopropoxy 2-methylpropoxy, 2-methylbutoxy, 3-methylbutoxy, 2-methylpentoxy, 3-methylpentoxy, 2-ethylhexoxy, 1-methylhexoxy, 2-octyloxy, 2-oxa-3-methylbutyl, 3-oxa-4-methylpentyl, 4-methylhexyl, 2-nonyl, 2-decyl, 2-dodecyl, 6-methoxyoctoxy, 6-methyloctanoyloxy, 5-methylheptyl-oxycarbonyl, 2-methylbutyryloxy, 3-methylvaleryloxy, 4-methylhexanoyloxy, 2-chloropropionyloxy, 2-chloro-3-methylvaleryloxy, 2-methyl-3-oxapentyl and 2-methyl-3-oxahexyl.

Bicyclic, tricyclic and tetracyclic mesogenic radicals are preferred. Furthermore preferred are radicals which contain not more than one piperidine-1,4-diyl group or naphthalene-2,6-diyl group.

Of the mesogenic radicals of the formulae I' and II' which contain a heterocyclic groups, those containing a pyridine-2,5-diyl group, pyridazine-2,5-diyl group, pyrimidine-2,5-diyl group or piperidine-1,4-diyl group are particularly preferred.

A smaller group of particularly preferred mesogenic radicals of the formulae I', I'2, II'1 and II'2 are listed below. For reasons of simplicity, Cyc denotes a 1,4-cyclohexylene group, Dio denotes a dioxane-2,5-diyl group, Cy denotes a 1,4cyclohexylene group in which, in addition, one or two adjacent $CH_2$ groups may be replaced by —O—, Phe denotes a 1,4-phenylene group in which, in addition, one or more CH groups may be replaced by N, PheX denotes a 1,4-phenylene group which is monosubstituted or disubstituted by F, Cl and/or CH3, Pip denotes a piperidine-1,4-diyl group and Nap denotes a naphthalene-2,6-diyl group.

Particularly preferred mesogenic radicals of the sub-formula I'1 are those of the sub-formulae I' 1-1 to I' 1-8:

| | |
|---|---|
| $R^2$—Cyc—$Z^1$—Cyc— | I' 1-1 |
| $R^2$—Phe—$Z^1$—Phe— | I' 1-2 |
| $R^2$—Phe—$Z^1$—PheX— | I' 1-3 |
| $R^2$—Phe—$Z^1$—Cyc— | I' 1-4 |
| $R^2$—Cyc—$Z^1$—Phe— | I' 1-5 |
| $R^2$—Cyc—$Z^1$—PheX— | I' 1-6 |
| $R^2$—Cyc—$Z^1$—PheX— | I' 1-7 |
| $R^2$—PheX—$Z^1$—Phe— | I' 1-8 |

In the compounds of the sub-formulae I' 1-1 to I' 1-8, $R^2$ is very particularly preferably an alkyl or alkenyl group, furthermore alkoxy or alkanoyloxy, in each case having 1–13 carbon atoms. Furthermore, $Z^2$ in these compounds is very particularly preferably an ester group (—CO—O— or —O—CO—), —$CH_2CH_2$— or a single bond.

Particularly preferred mesogenic radicals of the sub-formula I'2 are those of the sub-formulae I' 2-1 to I' 2-16:

| | |
|---|---|
| $R^2$—Phe—$Z^2$—Phe—$Z^2$—Phe— | I' 2-1 |
| $R^2$—PheX—$Z^2$—Phe—$Z^2$—Phe— | I' 2-2 |
| $R^2$—Phe—$Z^2$—Phe—$Z^2$—PheX— | I' 2-3 |
| $R^2$—Cyc—$Z^2$—Cyc—$Z^2$—Cyc— | I' 2-4 |
| $R^2$—Cyc—$Z^2$—Phe—$Z^2$—Phe— | I' 2-5 |
| $R^2$—Cyc—$Z^2$—Cyc—$Z^2$—Phe— | I' 2-6 |
| $R^2$—Cyc—$Z^2$—Cyc—$Z^2$—Dio— | I' 2-7 |
| $R^2$—Cyc—$Z^2$—Phe—$Z^2$—PheX— | I' 2-8 |

| | |
|---|---|
| R²—Cyc—Z²—Cyc—Z²—PheX— | I' 2-9 |
| R²—Nap—Z²—Cyc—Z²—Phe— | I' 2-10 |
| R²—Cy—Z²—Phe—Z²—Phe— | I' 2-11 |
| R²—Nap—Z²—Cyc—Z²—Cyc— | I' 2-12 |
| R²—Phe—Z²—Cyc—Z²—Cyc— | I' 2-13 |
| R²—Cyc—Z²—Phe—Z²—Cyc— | I' 2-14 |
| R²—Cyc—Z²—PheX—Z²—Cyc— | I' 2-15 |

Of the compounds of the sub-formulae I' 2-1 to I' 2-16 which contain a 1,4-phenylene group in which one or two $CH_2$ groups have been replaced by N, those containing a pyridine-2,5-diyl group or pyrimidine-2,5-diyl group are very particularly preferred.

Particularly preferred mesogenic radicals of the sub-formula II'1 are those of the sub-formulae II' 1-1 to II' 1-6. PheL denotes a group of formula

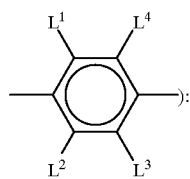

| | |
|---|---|
| Y¹-Q-PheL-Z⁴-Phe- | II' 1-1 |
| Y¹-Q-PheL-Z⁴-Cyc- | II' 1-2 |
| Y¹-Q-PheL-Z⁴-PheX- | II' 1-3 |
| Y¹-Q-PheL-Z⁴-Dio- | II' 1-4 |
| Y¹-Q-PheL-Z⁴-Pip- | II' 1-5 |
| Y¹-Q-PheL-Z⁴-Nap- | II' 1-6 |

Particular preferred mesogenic radicals of sub-formula II' 2 are those of the sub-formulae II' 2-1 to II' 2-9:

| | |
|---|---|
| Y¹—Q—PheL—Z⁴—Phe—Z³—Phe— | II' 2–1 |
| Y¹—Q—PheL—Z⁴—Phe—Z³—Cyc— | II'2– 2 |
| Y¹—Q—PheL—Z⁴—Cyc—Z³—Cyc— | II'2– 3 |
| Y¹—Q—PheL—Z⁴—PheX—Z³—Phe— | II'2– 4 |
| Y¹—Q—PheL—Z⁴—PheX—Z³—Cyc— | II'2– 5 |
| Y¹—Q—PheL—Z⁴—PheX—Z³—PheX— | II'2– 6 |
| Y¹—Q—PheL—Z⁴—Phe—Z³—PheX— | II'2– 7 |
| Y¹—Q—PheL—Z⁴—Phe—Z³—Nap— | II'2– 8 |
| Y¹—Q—PheL—Z⁴—PheX—Z³—Nap— | II'2– 9 |

In the compounds of the sub-formulae II' 2-1 to II' 2-9, at least one of the two groups Z4 and Z3 is very particularly preferably a single bond or $CH_2CH_2$ and the other is preferably also a single bond or —CO—O— or —O—CO—.

Liquid-crystalline side-chain polymers are prepared by polymerization processes which are known per se and are described in the literature (for example in the standard works such as Ocian, Principles of Polymerization, McGraw-Hill, New York), to be precise under reaction conditions which are known and suitable for the reactions. Use may also be made here of variants which are known per se, but are not described here in greater detail.

Obtaining a liquid crystal copolymer with a sufficiently high glass transition temperature is routine work for the expert, and does not require any inventive effort, in particular in case the liquid crystal copolymer is being based on side chain polymers and/or oligomers according to formulae I and II. It is, for example, well known among experts that the glass transition temperature of liquid crystalline polymers and/or oligomers can be increased if the length of the spacer is chosen to be rather short, for example, as $C_2$–$C_6$ and, in particular, $C_2$–$C_4$, and/or if a rather "stiff" polymer backbone like, for.example, a polymethacry- late, or a poly-α-haloacrylate is used. The glass transition temperature of the liquid crystal polymer component can also be increased by adding a high-$T_G$ liquid crystal polymer to a given base mixture.

The copolymer preferably exhibits a nematic, cholesteric or smectic phase; the clearing point is preferably somewhat higher than the glass temperature, in particular, 5–25° C., in order to have a sufficient temperature range of processing. Outside the temperature range of processing, the mixture can be liquid-crystalline or not liquid-crystalline.

It is usually sufficient if one of the liquid crystal copolymer components exhibits one or more liquid crystal states, in particular in the temperature range of processing since it was frequently observed that the reactive liquid crystalline component induces a liquid crystalline phase in the resulting mixture. Mixtures wherein both the liquid crystal copolymer components exhibit one or more liquid crystalline states are particularly preferred while mixtures wherein none of these components is liquid-crystalline, are usually less preferred.

In the case where the copolymer is formed in solution, it could be used by dissolving in a suitable solvent,e.g.,toluene and coating onto a substrate (with no alignment layer). Upon evaporation of the solvent and subsequent heating to the isotropic phase of the copolymer, followed by slow cooling, a scattering texture is produced. For this to occur the copolymer must have a clearing point >10° C. above Tg which ideally should be above ambient temperature. If a suitable dye is incorporated into the copolymer film,the film can be locally heated into the Isotropic liquid (written on) using a laser beam. On fast cooling,the written areas remain 'clear' and the clear state is locked in by cooling by Tg. Such devices exhibit permanent storage, etc.

The copolymers obtained are especially useful for permanent data storage. Verbal information, symbols, diagrams,etc,can be written in by heating the desired parts of the composite material with a finely focussed laser beam or other heat sources to temperatures above the glass transition resp. clearing temperature thus rendering the composite material transparent. The transparent state can be maintained by rapidly cooling the composite material below the glass transition temperature of the composite material, and the information is depicted in form of transparent characters, symbols,etc.,on a scattering background.

Heating should be effected rather rapidly in order to avoid dissipation of the thermal energy; heating with laser energy therefore is usually especially preferred. The composite materials according to the present invention sometimes exhibits no precise clearing temperature but the become progressively clearer in a temperature range of, for example, 10–20° C., and the maximum temperature is preferably adjusted in such a way that a high transparency and thus a high contrast is obtained.

Subsequently, the material is cooled below the glass transition temperature with a high cooling rate in order to avoid restoration of the scattering state; the cooling rate preferably is not less than 20 K/min and, in particular, more than 40 K/min; these values are, however, thought to be only illustrative and by no means limitative.

The copolymer can preferably be used, for example, as master-fiche in card-indices, as permanent overhead sheet etc. and is thus of enormous economic importance.

The polymerizable reactive components A and B are partly known and partly novel. Thus the invention relates to novel polymerizable, reactive liquid crystal compounds of formulae I or II in particular, wherein X is —C≡C—.

Furthermore, the invention relates to polymerizable, reactive liquid crystal compound of formula Ia

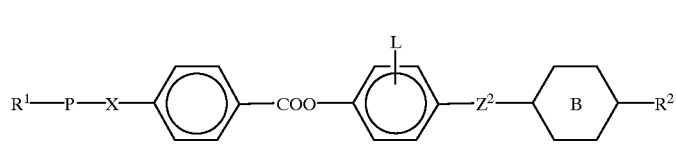
(Ia)

wherein $R^1$, $R^2$, P, —B— and X have the meaning given, and $Z^2$ is —CH$_2$CH$_2$— or a single bond, preferably —CH$_2$CH$_2$—

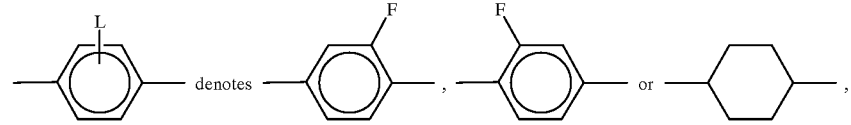

in particular compounds of formula Ia1 and Ia2:

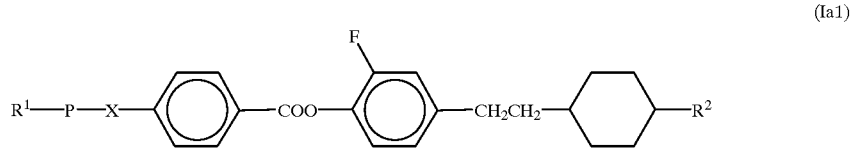
(Ia1)

(Ia2)

and of formula Ib

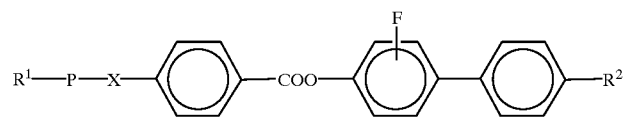
(Ib)

wherein $R^1$, $R^2$, P, —B— and X have the meaning given, and $Z^2$ is —CH$_2$CH$_2$— or a single bond, or in the case that $L_o$ is Cl $Z^2$ denotes also —O—CO—

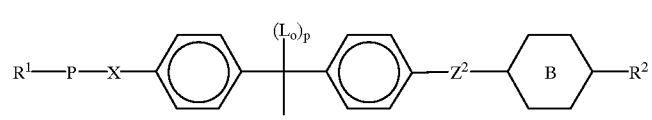

denotes a 4,4'-biphenyldiyl group being optionally substituted by p fluorine or chlorine atoms, and p is 0 or an integer between 1 and 4
in particular of formulae Ib1 and Ib2

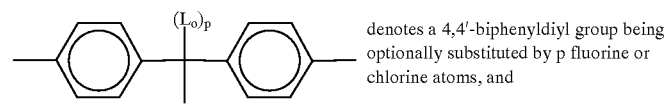
(Ib1)

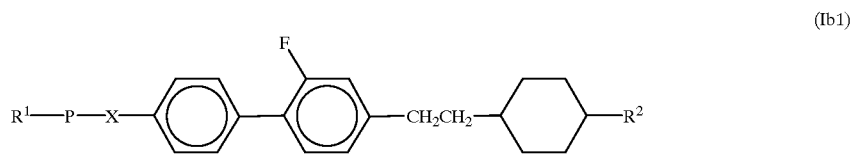
(Ib2)

Preferred embodiments of the invention are:

a) polymerizable reactive liquid crystal compounds wherein $R^2$ is achiral;

b) polymerizable reactive liquid crystal compound of formula II, wherein

Q—$Y^1$ is F, Cl, —OCF3, —OCF2H, —CF3 or OC2F5, in particular F or Cl;

c) polymerizable reactive liquid crystal compounds of formulae IIa or IIb

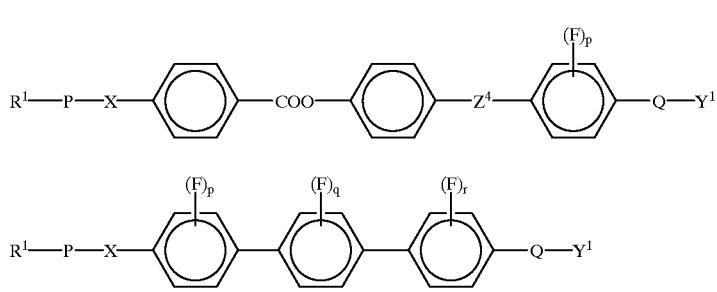

wherein $R^1$, P, X, Q, $Y^1$ and p have the meaning given,
$Z^4$ is —CH$_2$CH$_2$ of a single bond, and q and r are each independently 0 or an integer selected from 0 to 4;

d) polymerizable reactive liquid crystal compounds of formula I, wherein
X is —C≡C—,
or of formulae Ia and Ib, of formula II, wherein
Q—$Y^1$ is F, Cl, OCF$_3$, —OCF$_2$H, —CF3, —OC$_2$F$_5$,
of formula IIb wherein
$R^1$ is CH=CW—COO—
with W being H, Cl or CH$_3$.

A further aspect of the invention are liquid crystalline polymers obtainable by polymerization of at least one of the inventive polymerizable reactive liquid crystal compounds.

A further aspect of the invention are liquid crystalline polymers obtainable by substance photo-polymerization of at least one polymerizable reactive liquid crystal compound of formulae I or II, in the presence of a photo-initiator, at least one of said reactive liquid crystal compounds being oriented in its liquid crystalline phase, preferably in its nematic phase.

Liquid crystalline (co-)polymers obtainable by polymerization in the presence of a plasticizer, in particular a dialkylphthalate, or a chiral dopant, in particular a chiral cyanobiphenyl or phenyl benzoate, a menthol or lactic acid derivative, are preferred.

The invention relates to the use of a liquid crystalline (co)polymer according to the invention in the field of integrated optics, opto-electronic and/or information storage.

These reactive liquid crystals (RLC) can be used for either of two main uses:
1) Conversion into side chain liquid crystalline polymers (SCLCP) in solution.
2) In-situ photopolymerization of the RLC when oriented in their liquid crystalline phase.
Conversion into SCLCP The RLC may be dissolved in a suitable solvent and the polymerization initiated. This may be done with various initiator depending on the nature of the reactive group.

For example, when the reactive group is an acrylate, radical polymerization initiated thermally may be used to obtain the polymer.

Reference: C. B. McArdle in "Side chain liquid crystalline polymers" (1989) Blackie & Son Ltd ISBN 0-216-92503-7
In-situ photopolymerisation In this instance, the monomers are heated to their LC phase, aligned on a substrate and subsequently photopolymerized while still in the aligned LC phase. This gives an anisotropic polymer film.

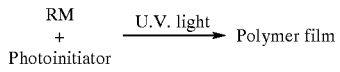

D. J. Broer, "In-Situ Photopolymerization of Oriented Uiquid Crystalline Acrylates" (1990)
D. J. Broer, Die Angewandte Makromolekulare Chemie (1 990), 183 45. These oriented polymers may be used for several passive and active optical components: (EP 0 397 263), (EP 0 428 213) or (EP 0 451 905).

The inventive reactive compounds can be made according to the following reaction schemes:

Scheme 1

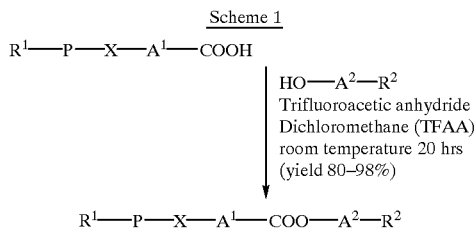

Scheme 2

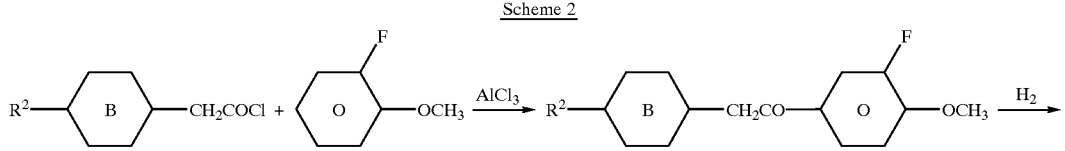

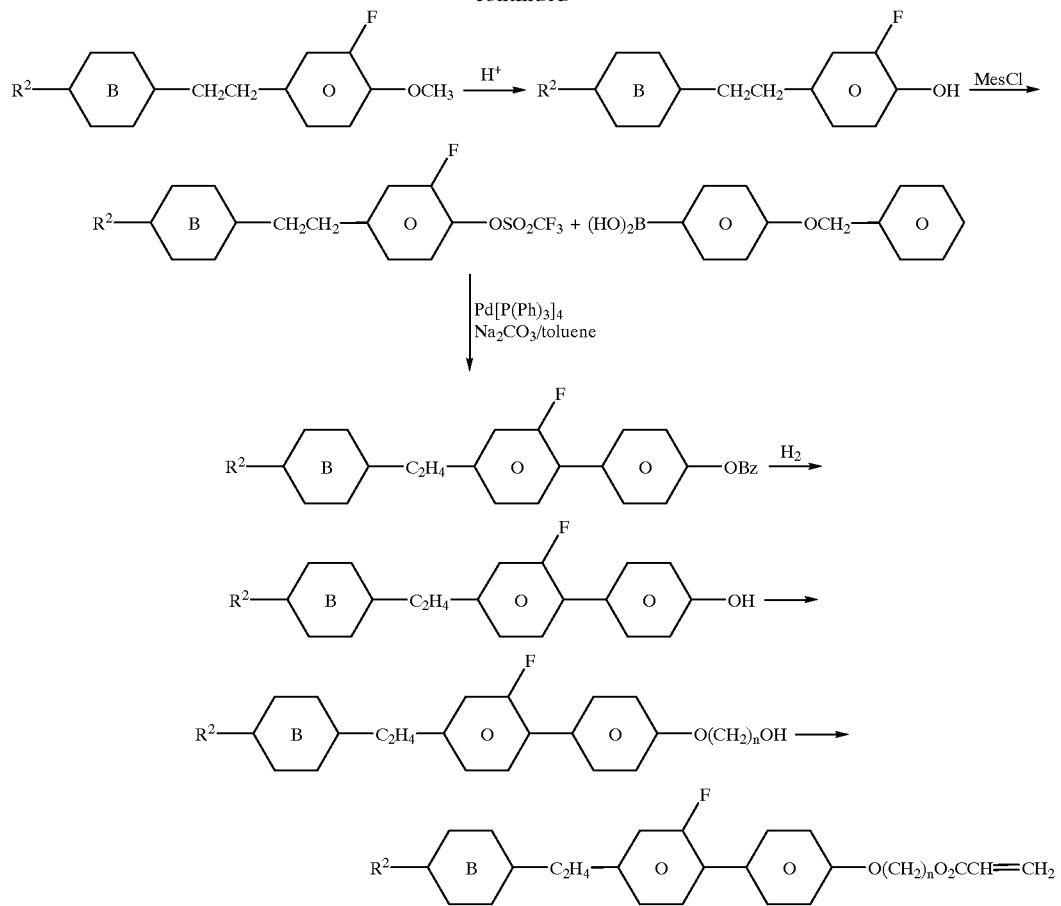
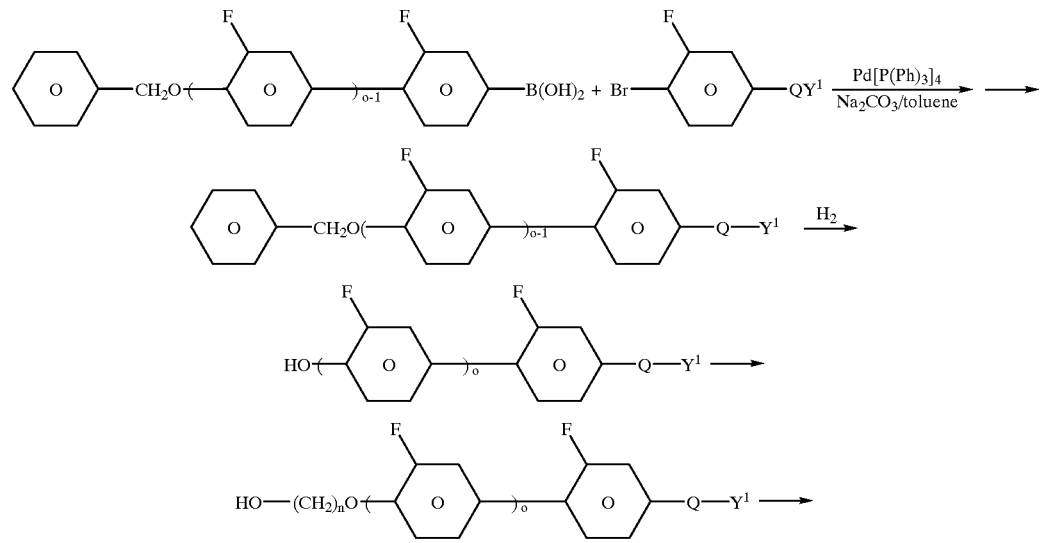

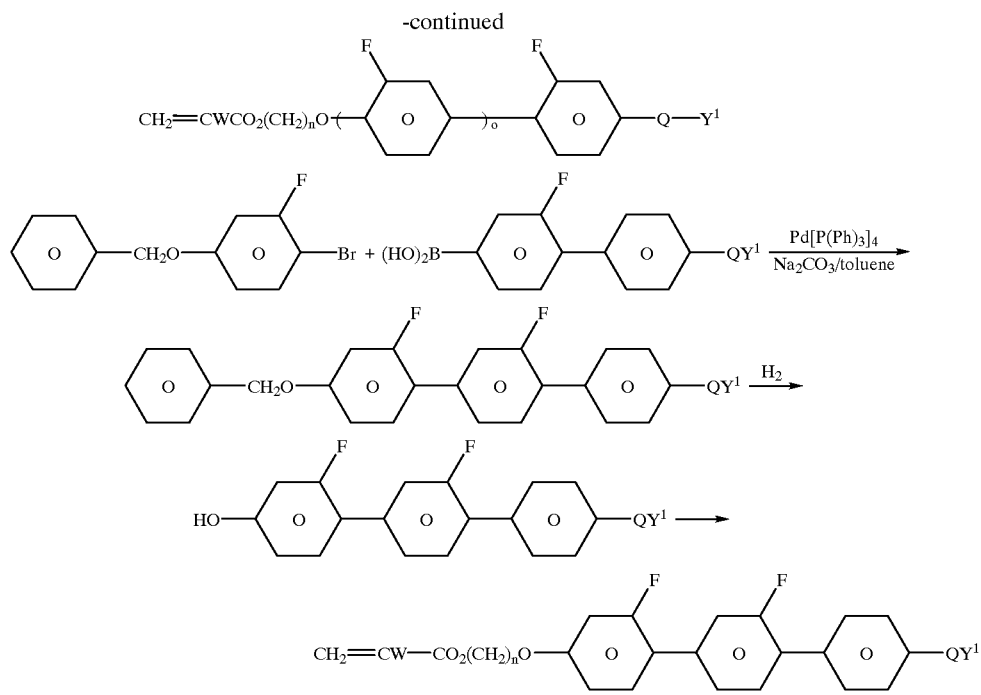
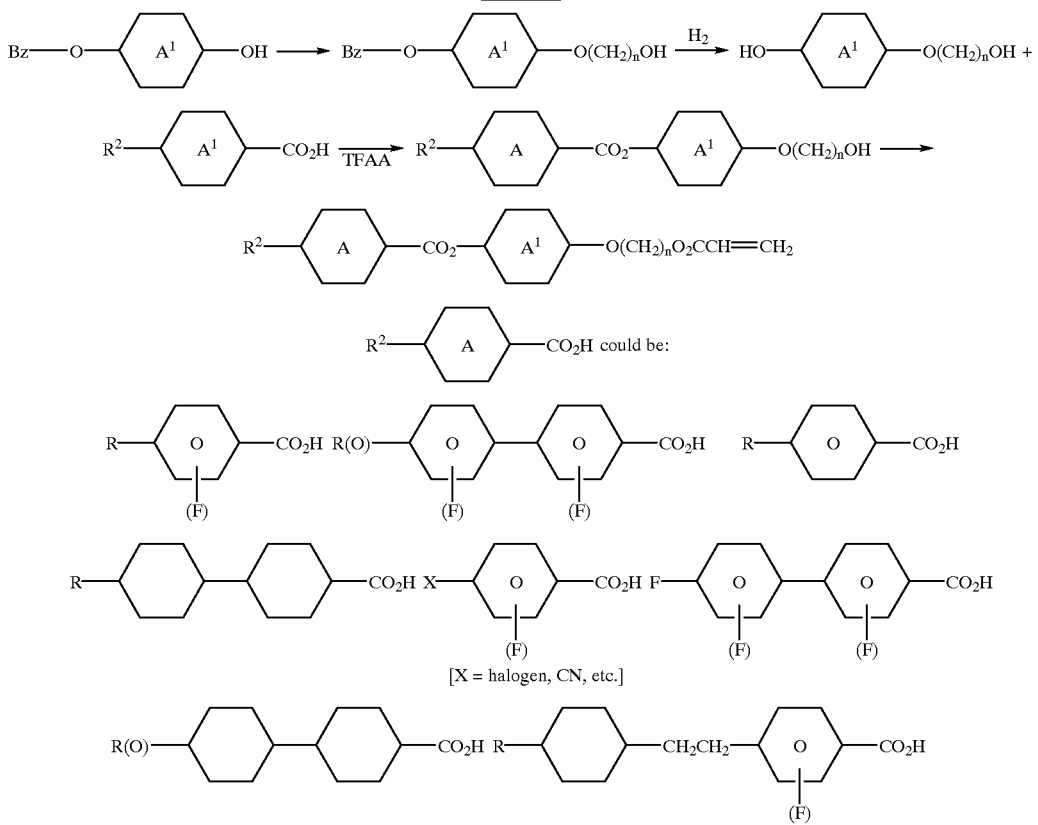

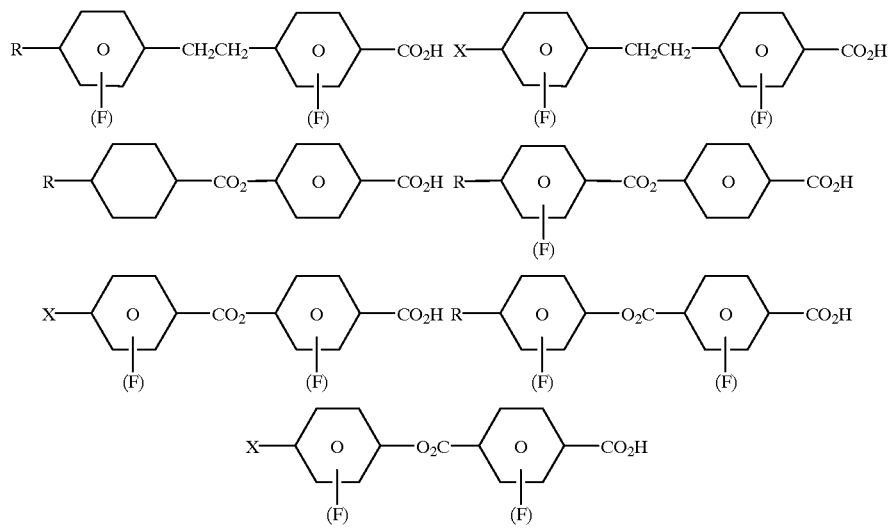
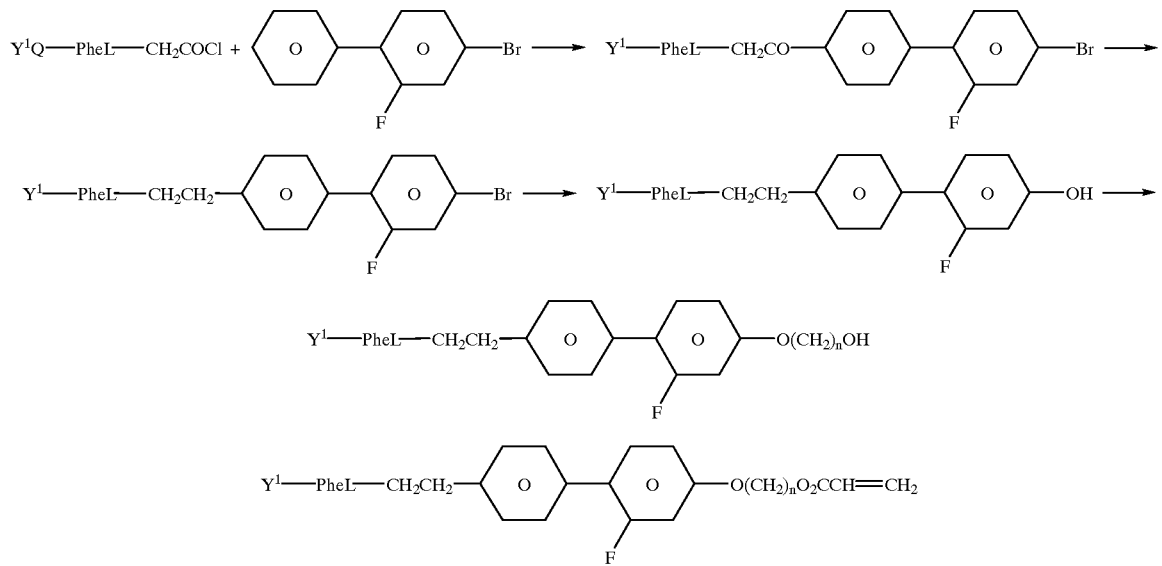
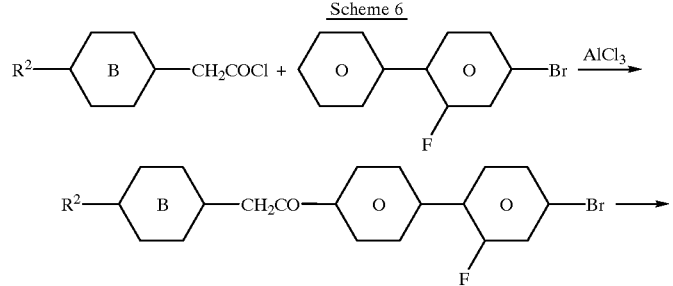

-continued

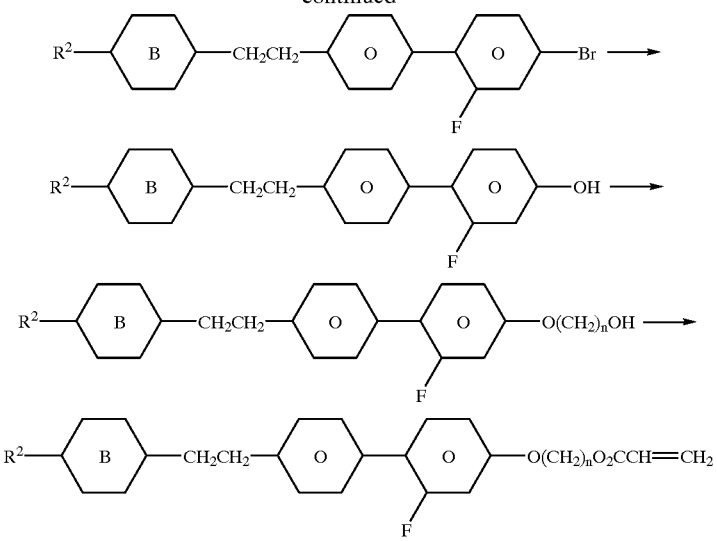

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application European No. 931 10680.1, filed Jul. 5, 1993, are hereby incorporated by reference.

The following examples are intended to be illustrative but by no means limitative.

EXAMPLE 1

Preparation of

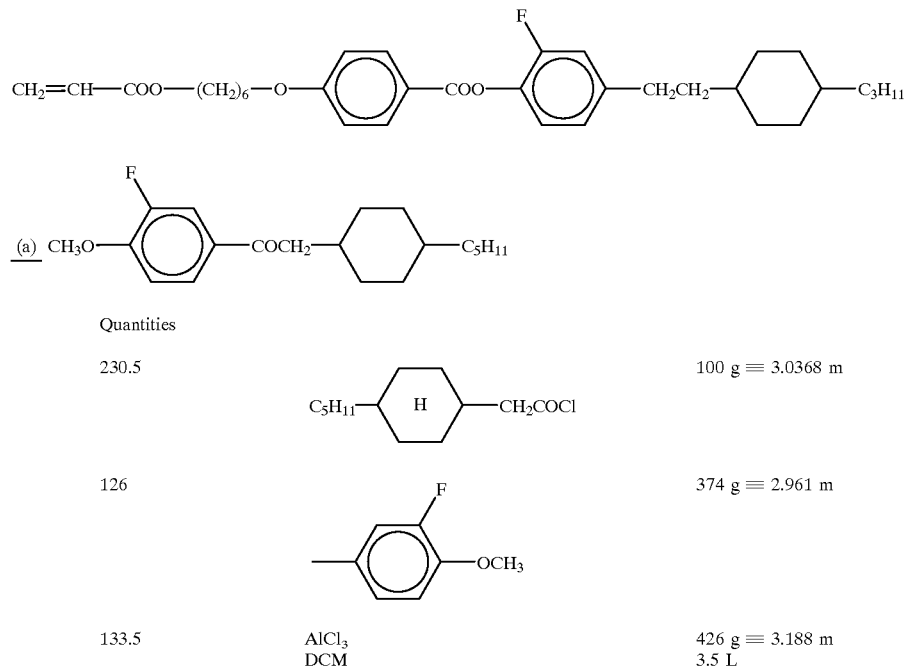

The $AlCl_3$, o-fluoroamide and DCM (21) were charged into a 101 flask fitted with stirrer, dropping funnel and thermo-meter which was vented to a scrubber. This mixture was then cooled to 10° C. and the acid chloride in DCM (1–51) was added maintaining the temperature below 15° C. On addition, the mixture was allowed to achieve room temperature, with stirring, overnight. Checked by TLC. The slight amount of anisole remaining is insignificant. The reaction mixture is poured onto ice, 1–5 kg and the ice is allowed to melt. The aqueous phase is removed and extracted with DCM (3×500 ml). The organics are combined and washed to neutral with water before drying over $Na_2SO_4$, filtering and evaporating to dryness. The crude, hot liquid is then diluted with MS (21) and the mixture is heated, hot filtered and left to crystallize. Yield=655 g addition of the $SOCl_2$, stirrng was contained for one hour until the mixture had become clear. The mixture was then poured onto 40 ml of water in a separating funnel. After separation, the ethereal layer was extracted with 20 ml of brine and dried over $MgSO_4$. The ether was then evaporated at 90° C. using a rotor evaporator. The yield of acyl chloride was 8.17g.

To 8.17 g of the acyl chloride was added 5.82 g of the phenol (0.022 mol) (b) 40 ml DCM and 46 ml trethylamine the reaction was left to mix initially in a cold bath for a period of 3 days.

The reaction was worked up by pouring into 1 ml HCl in 20 ml water. The aqueous layer was extracted with DCM.

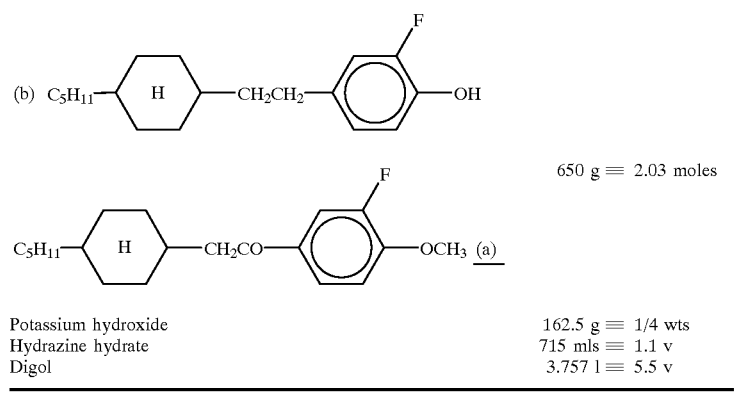

| Potassium hydroxide | 162.5 g ≡ 1/4 wts |
| Hydrazine hydrate | 715 mls ≡ 1.1 v |
| Digol | 3.757 l ≡ 5.5 v |

The starting materials were charged into a 20 l flange top flask sited on a mantle and fitted with an air stirred and reflux condenser. The mixture was then heated to ~138° C. and refluxed for two hours. The condenser was then rearranged and the mixture heated to 190° C., collecting the distillate. The condenser was then changed back and the mixture stirred and refluxed for 20 hours. A sample was taken out and checked by GC, after the reaction was complete. The mixture was poured onto ice (2 kg), acidified and extracted with DCM (3×11). The organics were combined and washed to neutral with water, dried, filtered and evaporated to dryness.

Analysis by GC showed that not only had the starting material been reduced but it had been totally demethylated as well.

Yield crude=640 g (14% by GC)

Distilled Yield=360 g

The DCM layers were then combined and washed with water and drted over anhydrous sodium sulphate.

The acid product was then columned on a silica column (60.7 g ) and eluted with 5% ethyl acetate in petrol 40–60° C. The product being first preabsorbed onto 2 weights of silica.

Results

Yield=10.60 g (81.0%)

Purity=95.58% by HPLC

The product was then recrystallized from 4 volumes, yield 9.19, HPLC 99.7%, of ethanol and dried overnight in the vacuum oven.

The product exhibits:

K 51.1 N 125.8 I

Analogously the following reactive compounds are obtained:

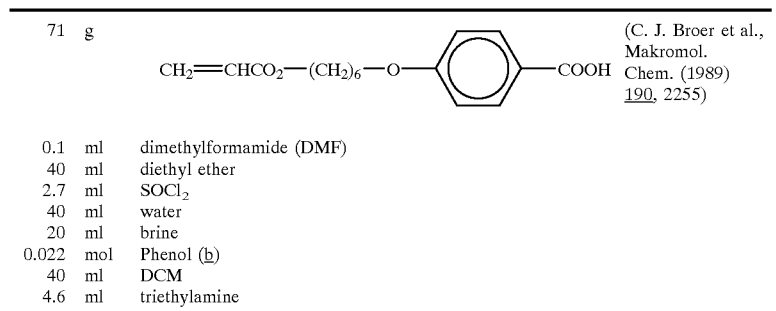

| 0.1 | ml | dimethylformamide (DMF) |
| 40 | ml | diethyl ether |
| 2.7 | ml | $SOCl_2$ |
| 40 | ml | water |
| 20 | ml | brine |
| 0.022 | mol | Phenol (b) |
| 40 | ml | DCM |
| 4.6 | ml | triethylamine |

To a mixture of 71 g hydroxyhexoxybenzoic acid (methacrylate ester) dimethylformamide and 40 ml of diethylether through which a stream of nitrogen was bubbled, was added, over a period of 20 minutes 27 ml of $SOCl_2$. After

| m | L | B (left) | R² | B (right) | phase |
|---|---|---|---|---|---|
| 4 | F | cyclohexyl | C₅H₁₁ | cyclohexyl | |
| 6 | F | cyclohexyl | C₃H₇ | cyclohexyl | K 54.9 N 124.5 I |
| 4 | F | cyclohexyl | C₃H₇ | cyclohexyl | |
| 6 | H | cyclohexyl | C₃H₇ | cyclohexyl | K 47.0 |
| 4 | H | cyclohexyl | C₃H₇ | cyclohexyl | K 54.9 N 124.5 I |
| 6 | H | cyclohexyl | Cl | cyclohexyl | K 85.8 $S_A$ 104.6 N 119.8 |
| 4 | H | cyclohexyl | Cl | cyclohexyl | |
| 6 | H | cyclohexyl | C₃H₇ | cyclohexyl | K 96.3 N 106.5 I |
| 4 | H | cyclohexyl | C₃H₇ | methylcyclohexyl | |

EXAMPLE 2

Preparation of

Preparation of

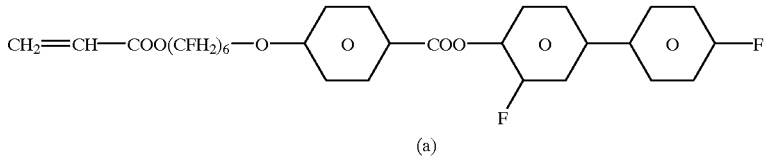

(a)

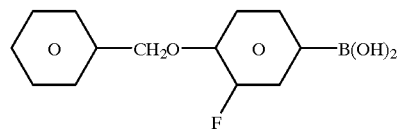

A solution of n-butyllithium (10.0 M in hexane, 3.30 ml) is added dropwise to a stirred solution of 3-fluoro-4-benzyl-bromobenzene (9.0 g) in THF (70 ml). The stirred solution is maintained under these conditions for 2.5 hrs and then a cooled solution of triisopropylborate (11.28 g) in dry THF (50 ml) is added.

After usual work-up the solvent is removed in vacuo to afford the product 2a.

(b)

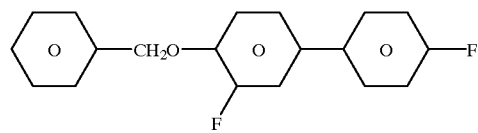

A solution of (2a) in ethanol is added to a stirred mixture of p-fluorobromobenzene and tetratros (triphenyl (phosphine)) palladium (O) in benzene and $_2$M-Na$_2$CO$_3$ at room temperature. The stirred mixture is heated under reflux (90–95° C.) for 23 hrs. After usual work-up the solvent is removed in vacuo and the residue is used in the following steps without further purification.

(c)

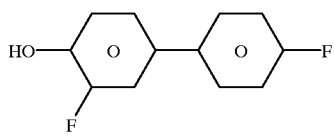

5% Palladium-on-charcoal (4.0 g) is added to the benzylether 2b in toluene. The stirred mixture is hydrogenated at atmospheric pressure for 4 hrs and the mixture is filtered. After usual work-up the solvent is removed to afford 2c.

(d)

The esterification with

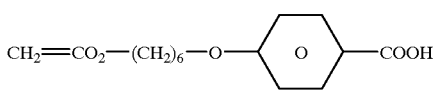

is carried out in analogy to example 1c and yields

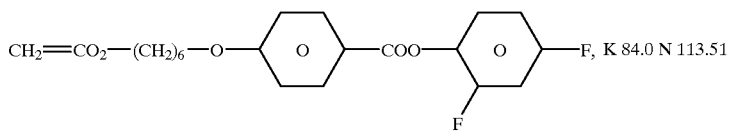

Analogously the following reactive compounds are obtained:

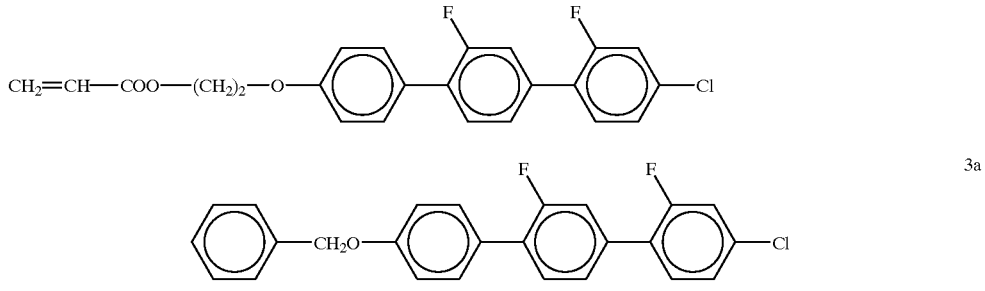

| m | L¹ | L² | R² | |
|---|----|----|------|---|
| 4 | F | H | F | |
| 6 | H | F | F | K 86.8 N 110.8 I |
| 4 | H | F | F | |
| 6 | H | F | Cl | K 67.7 SA 90.7 N 131.7 I |
| 4 | H | F | Cl | |
| 6 | H | F | C₃H₇ | K 74.2 S_A 82.7 N 128.2 I |
| 4 | H | F | C₃H₇ | |
| 6 | H | F | C₅H₁₁ | |
| 4 | H | F | C₅H₁₁ | |

$CH_2{=}CH{-}COO{-}(CH_2)_6{-}$—⬡—⬡—O—CO—⬡(Cl)—O—CH(CH_3)—C_6H_{13}

K 41.7 S_c 69.4 S_A 76.7 N 77.2 I

Example 3

Preparation of $CH_2{=}CH{-}COO{-}(CH_2)_2{-}O{-}$—⬡—⬡(F)—⬡(F)—Cl  \hfill 3a

⬡—CH_2O—⬡—⬡(F)—⬡(F)—Cl

4'-Benzyl-2-fluorobiphenyl-4-ylboronic acid is obtained analogously to example 2a from 4'-benzyl-2-fluoro-4-bromobiphenyl and is reacted with 4-chloro-2-fluorobromobenzene as described in Example 2b.

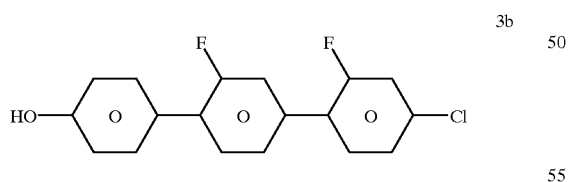

3a is hydrogenated analogously to the method described in Example 2c 3b is reacted with oxirane in the presence of pyridine and esterified with acrylic acid in the presence of trifluoroacetic an hydride and dichloromethane 20 hrs at room temperature.

The resulting product shows K, 73 K₂ 83 I.

After polymerization the side-chain polymer of formula

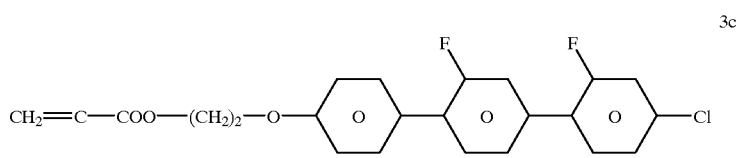

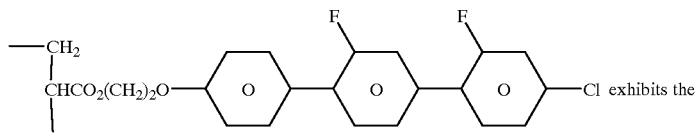 exhibits the following mesophases: Tg 53.8 N 181 I.

EXAMPLE 4

The following compounds are obtained in analogy to Example 2d by esterification of the corresponding phenols with the corresponding benzoic acids:

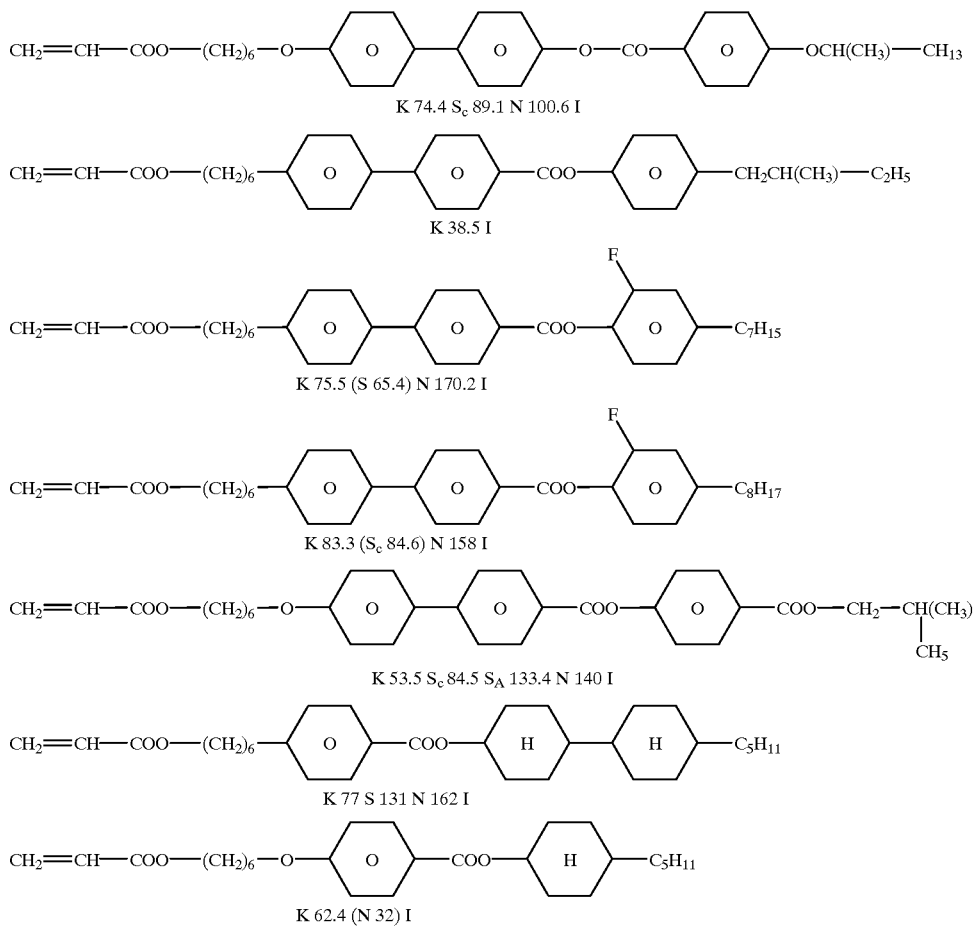

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Polymerizable, reactive liquid crystal compound of formula I $$R^1-P-X-A^1-Z^1-A^2-R^2$$

$R^1$ is $CH_2=CW-COO-$,

$HWN-$, $CH_2=CH-$ or $HS-CH_2-(CH_2)_m-COO-$ with W being H, Cl or alkyl with 1–5 C atoms and m being 1–7;

P is alkylene with up to 12 C atoms, it being also possible for one or more non-adjacent CH$_2$ groups to be replaced by —O—,
X is —O—, —S—, —COO—, —OCO—, —C≡C— or a single bond,
R$^2$ is a straight-chained, branched or chiral alklyl radical with up to 15 C atoms which is unsubstituted, mono— or polysubstituted by halogen, it being also possible for one or more CH$_2$ groups in these radicals to be replaced, in each cause independently of one another, by —O—, —S—, —CO—, —OCO—, —CO—O— or —O—CO—O— in such a manner that oxygen atoms are not linked directly to one another, or alternately R$^2$ has one of the meanings given for R$^1$—P—X—,
A$^1$ is a 4,1-cyclohexylene, a 1,4-phenylene in which one or two CH groups may be replaced by N or a naphthalene-2, 6-diyl radical which is unsubstituted or substituted by 1 to 4 halogen atoms,
A$^2$ is

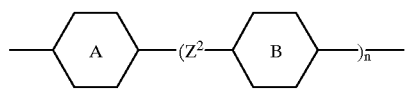

-continued

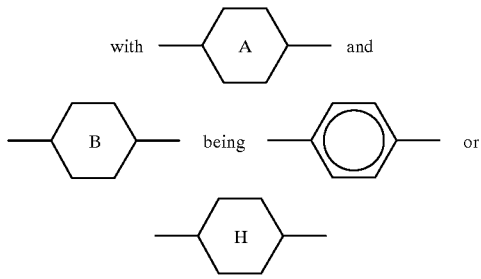

it being possible for these rings to be substituted by CN or halogen and one of the 1,4-phenylene groups can also be replaced by a 1,4-phenylene radical in which one or two CH groups are replaced by N,
and
Z$_1$ and Z$_2$ are each independently —CO—O—, —O—CO—, —CH$_2$CH$_2$—, —C|C— or a single bond, and n is 0 or 1 subject to the provisio that where R$^1$ is CH$_2$=CW—COO—, Z$^1$ and Z$^2$ are —CO—O—, —O—CO— or a single bond. a$^1$ is unsubstituted phenylene or naphthalene, A is unsubstituted phenylene and B is unsubstituted phenylene, then R$^2$ is not a chiral alkyl radical.

2. A polymerizable compound as in claim 1, wherein R$^1$ is CH$_2$=CW—COO—, and W is H, Cl or C$_1$–C$_5$ alkyl.

3. A polymerizable compound as in claim 1, wherein P is allylene with up to 12 C atoms and X is —O—, —COO—, —OCO— or a single bond.

4. A polymerizable compound as in claim 1, wherein Z$^1$ is —COO—, —OCO— or a single bond.

5. A polymerizable compound as in claim 1, wherein R$^2$ is a straight chain, branched or chiral alkyl or alkoxy group with 1 to 15 carbon atoms or of the formula R$^1$—P—X—.

6. A liquid crystal polymer or copolymer obtained by polymerization of at least one polymerizable compound of formula I of claim 1.

7. A liquid crystal polymer or copolymer of claim 6, obtained by in situ photopolymerization of at least one compound of formula I, in the presence of a photoinitiator.

8. A liquid crystal polymer or copolymer of claim 7, wherein at least one of said polymerizable compounds of formula I is oriented in its nematic or cholesteric phase when polymerized.

9. A method of using a liquid crystal polymer or copolymer of claim 6 which comprises incorporating a liquid crystal polymer or copolymer of claim 6 into at least one component for integrated optics, optoelectronics or information storage components.

10. A liquid crystal polymer of claim 7 obtained by in-situ photopolymerization of at least one compound of formula I in the presence of a chiral dopant.

11. A polymerible reactive liqdld crystal compound of formula

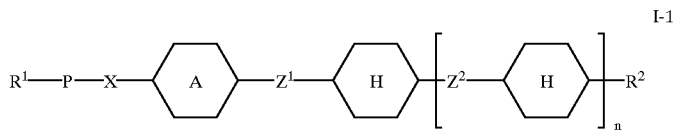

wherein
A is cyclohexylene or phenylene, and
R$^1$ is CH$_2$=CW—COO—, HWC—C—, HWN—, CH$_2$=CH— or HS—CH$_2$—(CH$_2$)$_m$—COO— with W being H, Cl or alkyl with 1–5 C atoms and m being 1–7;
R$^1$ is a straight-chaiked, branched or chiral alkyl radical with up to 15 C atoms which is unsubstituted, mono- or polysubstituted by halogen, it being also possible for one or more CH$_2$ groups in these radicals to be replaced, in each case independently of one another, by —O—, —S—, —CO—, —OCO—, —CO—O—or —O—CO—O—in such a manner that oxygen atoms are not likked directly to one another, or alternatively R$^2$ has one of the meanings given for R$^1$—P—X—,
P is alkylene wit up to 12 C atoms, it being also possible for one or more non-adjacent CH$_2$ groups to be replaced by —O—,
X is —O—, —S—, —COO—, —OCO—, —C≡C— or a single bond,
Z$^1$ and Z$^2$ are each independently —CO—O—, —O—CO—, —CH$_2$CH$_2$—, —C≡C— or a single bond, and
n is 0 or 1.

12. A polymerizable compound as in claim 11, wherein R$^1$ is CH$_2$=CW—COO—, and W is H, Cl or C$_1$–C$_5$ alkyl.

13. A polymerizable compound as in claim 11, wherein P is alkylene with up to 12 C atoms and X is —O—, —COO—, —OCO— or a single bond.

14. A polymerizable compound as in claim 11, wherein Z$^1$ is —COO—, —OCO— or a single bond.

15. A polymerizable compound of claim 11, wherein A is phenylene and $Z^2$ is a single bond.

16. A polymerizable compound as in claim 11, wherein $R^2$ is a straight chain, branched or chiral alkyl or alkoxy group with 1 to 15 carbon atoms or of the formula $R^1$—P—X—.

17. A liquid crystal polymer or copolymer obtained by polymerization of at least one polymerizable compound of formula I-1 of claim 11.